United States Patent [19]

Clark et al.

[11] Patent Number: 4,869,916

[45] Date of Patent: Sep. 26, 1989

[54] BLENDS OF HIGH ACYL GELLAN GUM WITH STARCH

[75] Inventors: Ross C. Clark; Daniel R. Burgum, both of San Diego, Calif.

[73] Assignee: Merck & Co., Inc., Rahway, N.J.

[21] Appl. No.: 194,695

[22] Filed: May 16, 1988

[51] Int. Cl.$^4$ .................. A23L 1/04; A23L 1/195
[52] U.S. Cl. .................. 426/573; 426/578; 426/575; 426/579; 252/310.01; 252/310.1; 252/310.3; 252/310
[58] Field of Search .............. 426/573, 575, 578, 579; 252/310.01, 310.1, 310.3

[56] References Cited

U.S. PATENT DOCUMENTS

| | | | |
|---|---|---|---|
| 4,326,053 | 4/1982 | Kang et al. | 426/573 |
| 4,517,216 | 5/1985 | Shim | 426/576 |
| 4,647,470 | 3/1987 | Sanderson et al. | 426/573 |
| 4,746,528 | 5/1988 | Prest et al. | 426/576 |

FOREIGN PATENT DOCUMENTS 020096 12/1980 European Pat. Off.
225154 6/1987 European Pat. Off.

OTHER PUBLICATIONS

Baird, et al., Bio/Technology, pp. 778–783, 1983.
D. D. Christianson, Hydrocolloid Interactions with Starches, NRRC, pp. 2–27, 1981.
Kang et al., "Some Novel Bacterial Polysaccharides of Recent Developement", pp. 231–253.
Sanderson, et al. Food Technology pp. 63–70. 1983.
Sanderson et al. Gum Stabilizers for the Food Industry 2: pp. 201–210, 1984.
Sandford, et al. Microbial Polysaccharides, Pure & Appln. Chem, 56: pp. 879–892 1984.
Process for the Preparation of Starch–Xanthan Compositions, U.S. Dept. of Agr., PB–290–097 1978.

Primary Examiner—Jeanette Hunter
Attorney, Agent, or Firm—Gabriel Lopez; Hesna J. Pfeiffer

[57] ABSTRACT

Blends of high acyl gellan and starch having textural and functional properties comparable to those of starch alone and fast-gelling food products, made with the blends, which food products have high shear-stability and low-rigidity. Methods of preparing the native gellan and starch blends of the invention and gelled products containing the blends are also included.

16 Claims, No Drawings

BLENDS OF HIGH ACYL GELLAN GUM WITH STARCH

BACKGROUND OF THE INVENTION

This invention relates to blends of high acyl gellan gum and starch having textural and functional properties comparable to those of starch alone. This invention also relates to fast-gelling food products, made with the blends of the invention and at least one food ingredient, which have high shear-stability and low-rigidity. Also part of the invention are methods of preparing the native gellan and starch blends of the invention and gelled products containing the blends.

The estimated U.S. consumption of natural and modified thickening and gelling agents used as food additives in 1983 was about 313,000 metric tons, with an average annual growth rate of 3.5% projected for an estimated 1988 consumption of 370,000 metric tons. Starches represent about 70% of the total. Today, approximately 100,000 metric tons of 43% of the starch used in the food industry is modified. However, current trends in the market are to minimize the use of modified starches or to replace them with non-modified starches because modified starches are expensive. In addition, several suspect chemicals have been used in the production of modified food starches. Starch is the most commonly used material to thicken liquid edible solutions, especially foods. In a typical application, starch is mixed with water, heated to swell the starch granules, and solubilize amylose molecules, and the dispersion is cooled to form a gel or a paste.

Although chemically modified starches comprise a large portion of the starches used in the food industry, chemical modification (cross-linking) limits the swelling of the granules and produces starches which are more shear stable than unmodified starches. Chemical modification (substitution) also controls the way that amylose chains re-associate to form gels.

Other hydrocolloids such as carboxymethyl cellulose (CMC) and xanthan gum have been used to improve the starch paste texture and/or reduce the amount of starch used. However, these hydrocolloids usually also have a detrimental effect on the cook-up viscosity of the starch. Hydrocolloids have also been used to improve the shear stability of starches, and some, such as carrageenan, have proven effective. However, large amounts of carrageenan must be added to attain this effect.

A variety of starch derivatives are known in the art, and some are described below.

Thin boiling starches: These are starches produced by acid hydrolysis. Usually either hydrochloric or sulfuric acids are used the hydrolyze the starch. They do not swell as much upon cooking as raw starch, but become opaque and form rigid gels on cooling. These starches are useful in gum candies and in applications utilizing the film forming properties of starch.

Cross-linked starches: These starches can be produced with polyfunctional reagents, i.e., reagents which contain two or more reactive groups to form bridges between polymer chains within the starch granule. Food starches are usually cross-linked using reagents of the phosphate ester type (phosphorous oxychloride or sodium trimetaphosphate). The purpose is to prevent the starch granule from swelling beyond a certain point. Cross-linking acts mainly on the outer surface of the granule since it is done without gelatinizing the starch. This chemical bonding around the surface inhibits the breakdown or rupturing of the starch granule during processing. This, in turn, reduces the amount of amylose and amylopectin molecules in solution. Cross-linked starches eliminate the elastic or rubbery texture of regular or waxy maize gelatinized starches. They provide a desirable short smooth texture and reduce breakdown of viscosity in retorting of acidic food products. They provide thickening at lower concentrations and decreased shear breakdown in processing. Such starches, however, still suffer from problems of retrogradation since they do not bind water well. For this reason they are not freeze-thaw stable.

Acetate Modified Starches: Starch acetates are commonly prepared from acidic anhydride in an alkaline starch suspension at low temperatures. The resulting starch has a non uniform degree of substitution as more acetate groups are found on the outside of the granule than on the inside. These starches are considered more modified than the cross-linked starches. This modification reduces the amount of association between the starch chains after gelatinization. Small amounts of acetyl groups can eliminate the low temperature instability waxy maize cross-linked starches to give stability, texture and clarity in pie fillings, salad dressings and frozen foods. With regular starches (owing to the association of the amylose) the retrograded structure can be minimized to provide products with smooth uniform body. These products are more expensive to produce than native or simple cross-linked starches and are considered more radical than either of these.

Hydroxyalkyl Starches: Hydroxyalkyl starch ethers are produced from starch and an alkaline oxide. The modification is carried out at sub-gelatinization temperatures. This modification improves the "water binding" capacity of the starch. This modification is considered more radical than other chemical modifications to starch as many of the impurities remain after the modification is complete. These starches have been suspect due to these impurities. In addition, these starches are the most expensive to produce. Also, these starches usually require a higher use level to achieve a viscosity similar to a lesser modified or non-modified starch. Starch pastes of this modification tend to be more cohesive than simple cross-linked products. They are more clear and stable to low temperatures and they exhibit good freeze-thaw stability. In addition, the gelatinization temperature is usually lowered significantly. Both of the above described processes are under scrutiny by international regulatory agencies. As a result major food producers are seeking more natural or natural fundamental alternatives to these modifications.

Combinations of deacetylated and partially deacetylated gellan gum and starch are known in the art. For example, Baird, et al., Bio/Technology, page 781 (November 1983) disclose that it may be desirable to use gellan gum in combination with modified starches to obtain optional product texture and stability. Kang, et al., "Some Novel Bacterial Polysaccharides of Recent Development", page 240, disclose that gellan gum may be used as a structuring agent to replace or partially replace the starch. Sanderson et al., Food Technology, (April 1983) disclose: in Table 4, page 66, a starch jelly formulation containing 6.56% starch and 0.2% gellan gum; at page 68, FIG. 8 am amylograph for a 4.8% starch/0.2% gellan gum blend; and at page 68, the advantages of combining starch and gellan gum in pie fillings and puddings. U.S. Pat. No. 4,517,216, Table 1—1 discloses blends of 0.25% gellan gum and 0.25% corn starch. These blends contain higher amounts of gellan gum than the blends of this invention.

Accordingly, providing a blend of native or modified starch with low amounts of high-acyl gellan gum of reduced cost and equal or improved characteristics such as starch pastiness and flavor would be highly desirable.

SUMMARY OF THE INVENTION

This invention relates to a blend of gellan gum and starch in a proportion of about 0.01–0.50:1, optionally with a liquid carrier and additives. These blends exhibit useful rheological and other physical properties which make them useful in various applications, primarily in food compositions.

This invention also relates to a fast-gelling food product comprising a gelled matrix having high shear-stability and low-rigidity, comprising about 2 to 10% (wt.) of the blend of this invention with respect to the total weight of the product; and at least one food ingredient dispersed in the matrix.

This invention also relates to a method of preparing a fast-gelling blend having high shear-stability and low-rigidity, comprising (a) mixing gellan and starch in a ratio of about 0.01–0.05:1; (b) admixing the blend with a liquid carrier in a proportion of about 2 to 10% (wt.) of the blend with respect to the total weight of the carrier and the blend; and (c) heating and then cooling said admixed blend under conditions effective to gel the blend.

This invention relates as well to a method of preparing a fast-gelling food product having high shear-stability and low-rigidity, comprising dispersing at least one food ingredient in a solution of the blend of the invention; and heating and then cooling the solution comprising the blend and the food ingredient under conditions effective to form a gelled matrix containing said food ingredient therewithin.

DETAILED DESCRIPTION OF THE INVENTION

The blends of the invention are suitable as substitutes for starches and/or to enhance their functionalities. The present blends are also suitable for use in sauces, soups and gravies as well as in pumpable-type systems such as pumpable jellies, fillings or icings.

The gellan starch blend of the invention is easily dispersable in cold water and can then be heated to gelatinize the starch and solubilize the gellan. By varying the amounts of starch and gellan within the ranges prescribed herein the final consistency of the product may be affected. Thus, different textures can be given the product making it more starch-like or more gel-like, depending on the ratio of the gellan to starch utilized.

The major parameters governing starch behavior are gelatinization and retrogradation. Briefly, during gelatinization (heating over a temperature range) the granule swells and loses birefringence, the pastes clarify and viscosity increases and smaller amylose molecules are solubilized and leach out. Upon cooling retrogradation "setback" occurs, whereby the small amylose molecules reassociate to form a precipitate or gel, the paste becomes cloudy; and syneresis occurs. Some important processing variables which can effect starch gelatinization in food are temperature, time, shear and pH. The higher the temperature, the more the granules swell. The more swollen the granule, the more fragile and susceptible it becomes to rupture by shearing. Acids disrupt the degree of hydrogen bonding to bring about a more rapid swelling of the granule and thus make the swollen granule peak sooner and break down faster. Shearing subsequent to cooling causes a dramatic decrease in viscosity unless the starch has been highly modified.

In the context of this application, gellan gum is defined as native, fully acetylated gellan gum and the clarified forms thereof, which are described in U.S. Pat. No. 4,326,053, which is incorporated herein by reference.

Unexpectedly, the addition of the low amounts of gellan gum to the starch in the blend of the invention has only a minor effect on the viscosity of the paste during the cooking of the blend. This is a clear advantage of the present blends when compared to other hydrocolloids or blends thereof which display marked increases in viscosities during the gelatinization and cooking of the starch blends. The minimal viscosity effect brought about by the addition of low amounts of gellan gum to the starch during the gelatinization step combined with the ability of gellan to provide by itself some viscosity structure and a rapid set-back on cooling provides a further advantage over starch alone. This is so because this blend allows for faster heat penetration during cooking and affords the product more of a structure thereafter. This even lowers the processing time and allows for a reduction in the amount of starch required for particular purposes.

Moreover, the addition prior to gelatinization of a low amount of gellan to the starch in accordance with this invention has been found to improve the shear stability of the starch and to lower syneresis of the paste after cooling. Moreover, the low levels of gellan added to the starch herein have also been found to impart a viscosity-building capability to the felled blends which is evident following the shearing of the paste.

When other hydrocolloids are added to starch to reduce the amount of this ingredient required, an undesirable increase is observed in the viscosity of the paste during cooking as well as a slowing of the heat penetration. These two effects lead to increased processing times for the prior art blends.

The blend of the invention consists essentially of gellan and starch in a ratio of about 0.01–0.50:1, more preferably about 0.05–0.25:1, and still more preferably about 0.1:1.

Any starch known to be edible and useful in the food industry may be utilized in the blends of this invention. Examples of such starches are corn, waxy maize, tapioca, wheat, potato and rice starch, among others. Also suitable are mated and chemically-modified starches such as cross-linked and substituted starches.

Also provided herein is a gelling composition comprising the blend of the invention, and optionally an edible carrier such as water. However, other liquid or solid carriers known to be useful in edible gelling compositions known in the art can also be utilized.

Particularly preferred are compositions where the blend of the invention is present in an amount of about 2 to 10% of the total weight of the carrier, the blend, and any other additives.

The gelling composition may also comprise one or more additives such as flavoring agents, coloring agents, aromatizing agents, texturing agents, sugars and animal and vegetable proteins, among others. Other additives known and used in the art can also be utilized with the blends of the invention. The additives are incorporated into the blends in amounts known in the art.

The dried blend of gellan and starch in accordance with this invention affords an improved storage stability with respect to the starch alone by improving the water holding capacity of the paste and thus reducing syneresis. In turn, this characteristic imparts an increased shelf stability to food products containing the gellan-starch blends of this invention.

In another aspect of this invention, the gelling composition may be prepared by a method comprising for forming a blend of gellan and starch in a ration of about 0.01–0.05:1, admixing the blend with a liquid carrier in a proportion of about 2 to 10% of the blend with respect to the total weight of the carrier and the blend, and heating and then cooling the admixed blend under conditions effective to gel the blend.

The heating may be conducted at a temperature of about 65° to 90° C., preferably at a temperature over 85° C. The heating may be conducted for a period of time sufficient to dissolve the blend components, and preferably about 15 sec. to 10 min., and more preferably about 30 seconds to 5 minutes.

The cooling after the heating step may be conducted at various temperatures, including temperatures such as room temperature or lower, such as refrigerating temperature. The period of time for which the cooling step is conducted depends on the temperature at which the product is allowed to cool as is known in the art.

In a particularly preferred embodiment of the invention, the above method further comprises shearing the gelled blend and allowing the sheared blend to stand to attain a creamy consistency.

Also provided herein is a fast-gelling food product having high shear-stability and low-rigidity, which comprises a gelled matrix comprising about 2 to 10% of the blend of the invention with respect to the total weight of the product and the blend, and at least one food ingredient dispersed within the matrix. The blends of the invention can be used to prepare any number of food products requiring a creamy or gelled consistency. The food product may be in liquid or solid form, e.g., sauces, soups, baby food, jellies, mousses, fillings, toppings, jams, gelatins, fish, animal and vegetable pastes, and the like. Other foods not described herein are also contemplated within the confines of this invention and may be used as is know in the art.

In another aspect of this invention the fast-gelling food product of the invention having high shear-stability and low-rigidity may be prepared by a method comprising dispersing at least one food ingredient in a solution of the blend of this invention, and heating and then cooling the solution under conditions effective to form a gelled matrix containing the food ingredient therewithin.

In a particularly preferred embodiment of the above method, the solution is an aqueous solution. In another preferred embodiment, the blend is present in the food product in an amount of about 5 to 7.5% by weight with respect to the total weight of the food product.

If the food ingredient is in liquid form the dry blend may be admixed with it without a carrier. Suitably, the heating step may be conducted at a temperature of about 65° to 90° C., preferably over about 85° C.

The cooling step may be conducted at a temperature such as room temperature or lower, such as refrigeration temperature. In a particularly preferred embodiment of this invention the above method further comprises cooking the gelled food product and then cooling it. The conditions for conducting the latter two steps are known in the art and need not be described herein.

The addition of the gellan gum to the starch in accordance with this invention aids in the gelling of the paste after cooling. The texture of this paste is determined by the concentration of the gellan, the type and concentration of the starch, the pH of the paste and the concentration of ions present in the system. All these are variations contemplated within the context of this invention.

Having now generally described this invention, the same will be better understood by reference to certain specific examples, which are included herein for purposes of illustration only and are not intended to be limiting of the invention or any embodiment thereof, unless so specified. It will be apparent to one of ordinary skill in the art that many changes and modifications can be made thereto without departing from the spirit or scope of the invention as set forth herein.

EXAMPLE 1

Comparison of Brabender Amylograph Curves of 5% Starch and Blends of 5% Starch–0.1% Gellan Gum (Corn, Waxy Maize, Cross-linked Waxy Maize and Acetylated Cross-linked Waxy Maize

AMYLOGRAPH TEST PROCEDURE

Sample Preparation:

500 g samples are prepared for use in the Brabender Visco-amylograph (C. W. Brabender Instruments Inc,.). All samples are run in both standard tap water (STW) and STW with 2% of 100 grain vinegar (WA) as described below. (STW comprises 1000 ppm NaCl and 143 ppm $CaCl_2 \cdot 2H_2O$ dissolved in deionized water.)

(1) Water, starch and gum are measured out.

(2) The gum is added to ⅔ of the water in a 600 ml beaker with mechanical agitation and stirred for 10 minutes. The measured amount of starch is then added and mixing is continued for several minutes.

(3) The dispersion is poured into a Brabender sample cup and the remaining water is used to rinse the beaker and stirrer for most of the sample. This is added to the cup.

(4) The cup is placed into the Brabender unit.

Sample Testing Procedure:

(1) The machine is set to 75 RPM.

(2) With rapid heating to 50° C.

(3) Heating is controlled from 50° to 95° C. (temperature increased at 1.5 degrees per minute, timer set to 30 minutes).

(4) The raw native starches tested are held for 15 minutes at 95° C. The modified starches, being more heat and shear resistant are held for 30 minutes at 95° C.

(5) Cooling is done from 95° to 50° C. (temperature decreased 1.5 degrees per minute).

Results of Visco-Amylograph Testing:

Test trials conducted on the amylograph indicate the following.

(1) The addition of native gellan gum has little effect on the viscosity of the starch pastes above 85° C., but may increase the paste viscosity in the 68° to 80° C. range.

(2) In all the tests it is found that the native gellan gum added aids in gelling the starch pastes after cooling. The texture of the pastes are determined by the concentration of the gum, the type and concentration of the starch used, and the pH of the paste. Native gellan gum-starch blends are found to set-back faster than the starch paste alone.

(3) Native gellan gum does not appear to cross-link with the starch during gelatinization since only slight changes in viscosity are observed in the pasting curves run on the Visco-amylograph.

(4) Native gellan gum has only a slight effect on the acid stability of the viscosity of the starch paste during cooking.

(5) Native gellan gum performs similarly to low acyl gellan gum in a blend with starch in that it seems to have only a slight effect on the pasting curves. However, contrary to low-acyl gellan gum-starch blends the gellan-starch blends of this invention have an even greater improving effect on the final texture when low amounts of gellan are added to the starch described herein.

RESULTS OF INDIVIDUAL TRIALS:

EXAMPLE 2

Native Corn Starch With and Without Gellan in Tap Water

When added to native corn starch gellan gum has little effect on the viscosity curve of the starch until well into the cooling cycle. A low peak is observed with gellan gum in the 68° to 80° C. range. This corresponds to the hydration of the gellan gum and not to the beginning of starch gelatinization. If the level of gellan gum is increased to 0.5% this peak becomes quite noticeable and may reach 300 to 400 B.U. but then drops almost to 0 before rising again. The gellan gum does not affect the pasting temperature of the native corn starch as may be inferred by the rise and drop observed prior to the second rise. More likely, the first peak is a viscosity build peak created by the hydration of the gellan gum, and the second peak corresponds to the typical gelatinization curve of corn starch.

EXAMPLE 3

Amioca Starch (Native Waxy Maize Starch) With and Without Gellan in Tap Water

The pasting temperature appears to be basically unaffected with the addition of gellan gum to native waxy maize or Amioca. The gellan gum appears to cause the viscosity to increase slightly sooner, but not significantly. The gellan gum-native waxy maize starch blend sets back sooner than the starch alone.

EXAMPLE 4

4.5% Cross-linked Waxy Maize Starch (W-13) With and Without Gellan in Tap Water

The pasting temperature of the starch is slightly lowered by the addition of the gellan gum. However, this is due to the hydration of the gum as discussed earlier. The addition of gellan gum to the starch causes a slight increase in the pasting peak, but otherwise does not affect the viscosity curve until half way through the cooling cycle. The gellan gum-cross-linked waxy maize blend again sets back much faster at a high temperature than starch alone.

EXAMPLE 5

Acetylated Cross-linked Waxy Maize Starch With and Without Gellan in Tap Water

The results are similar to those of Example 4. The addition of gellan gum has a dramatic effect on the pasting peak of the starch. The viscosity during the 95° C. holding period is slightly lower in the samples containing gellan gum. Upon cooling, the samples with the gellan gum-acetylated cross-linked waxy maize starch blend again set back much sooner than the other samples.

EXAMPLE 6

Comparison of Shear Stabilities of Cornstarch, Amioca, Cross-linked Waxy Maize and Acetylated Cross-Linked Waxy Maize With and Without 0.1 wt % Gellan in Tap Water and 2% Vinegar

SHEAR STABILITY PROCEDURE

The procedure used to examine the shear stability of the samples is based on the method of Klaushofer, H., STARCH, "On Determination of Shearing Stability of Starch Pastes" (June 1975).

Sample Preparation:

250 g samples are prepared in STW and in WA for shear stability testing.

(1) Water is measured out in a 450 ml stainless steel cup (Type 316, Reading Scientific Co., Reading, Penn.).

(2) Gum and starch are measured out separately. The gum is added to the water with mechanical agitation and stirred for about 5 minutes. The starch is added to the gum solution and mixed for 5 additional minutes.

(3) To gelatinize the starch, the cup is placed in a hot water bath heated to 95° C. The solution is covered with a plastic cover with a hole placed in the center to allow for the shaft of a propeller type stirrer to run through it. The solution is then continuously mixed at 360 RPM while cooking.

(4) The native starches are left in the water bath for 30 minutes and the modified starches for 45 minutes.

(5) At the completion of cooking the cups are removed from the bath and allowed to cool overnight at room temperature.

Sample Testing:

(1) A viscosity reading is taken on the cooled starch paste sample using a Brookfield RVT with a Helipath attachment at 2.5 RPM using an appropriate T-bar type spindle and recorded.

(2) The sample is mixed at 1800 RPM for 5 minutes using a 3 blade propeller type mixing blade which is 2" in diameter.

(3) Immediately following mixing, the viscosity is measured again using the RVT viscometer and record.

(4) The sample is allowed to stand undisturbed overnight and the viscosity measurement is retaken using the RVT viscometer and record.

Results of Shear Stability Tests:

Gellan when added to a starch increases the viscosity of the starch pastes after cooling. In all tests, the starch pastes exhibited a soft elastic gel matrix with the addition of only about 0.1% gum. When the gellan gum is added to the starch it improves the shear stability of the paste. Generally, the modified starches display better shear stability than the unmodified starches.

A viscosity increase is observed by allowing the starch-gellan gum blends to stand following shearing. This is an unexpected improvement of the blends of the invention when compared with starch alone.

EXAMPLE 7

Comparison of Storage Stability in Tap Water and 2% Vinegar of 5% Corn Starch, Waxy Maize Starch, Cross-linked Waxy Maize and Acetylated Cross-linked Waxy Maize With and Without 0.1% Gellan

RETROGRADATION TEST PROCEDURE

Sample Preparation:

The samples are prepared in the same manner as the samples for the shear stability test procedure except for step 5 which is conducted under the following conditions.

(5) At the completion of cooking, aliquots of the cooked paste are poured into five 50 ml beakers (about 40 ml). The samples are allowed to cool at room temperature for 30 minutes, then covered with plastic Saran Wrap and placed in the refrigerator at 2° C. The samples are later removed as required for testing (0, 2, 6, 10 days).

Sample Testing:

(1) The samples are removed from the refrigerator at the specified times. They are allowed to stand at room temperature for several hours. Then viscosity measurements are taken using the Brookfield RVT apparatus with Helipath 2.5 RPM spindle CC.

(2) A portion of the sample is removed from the 50 ml beaker and placed in a plastic ring 1" in diameter and ½" in height setting in the ring, level to the top of the ring.

(3) After one hour the sample is removed and the area dampened by the water migrating out of the paste is traced on the paper.

(4) The paper is dried overnight.

(5) The filter paper is weighed and recorded (W1). Using scissors, the area traced on the paper which had previously been wetted is cut out. This second piece of paper (W2) is then weighed. W2 is divided by W1 and multiplied by 100 to obtain a percentage value.

Results of Storage Stability Test:

Gellan gum when added to starch improves its storage stability by delaying increases in viscosity with time and by improving the water holding capacity of the starch. For example, an increase in viscosity with time is observed in the control corn starch sample while the water holding capacity of the paste diminishes. The improving effect of gellan gum on the water holding capacity of the starch paste is more noticeable with the raw starches than with the more highly modified starches.

What is claimed is:

1. A blend consisting essentially of high acyl gellan gum and starch in a ration of about 0.01–0.50:1.

2. The blend of claim 1, wherein the ratio of the gellan gum and the starch is about 0.05–0.25:1.

3. The blend of claim 1, wherein the starch is selected from the group consisting of corn, waxy maize, tapioca, wheat, potato, and rice starch.

4. The blend of claim 1, wherein the starch is selected from the group consisting of native and chemically-modified starch.

5. A gelling composition, comprising a carrier and 2–10% by weight of the blend of claim 1.

6. The gelling composition of claim 5, wherein the carrier is water.

7. The gelling composition of claim 5, further comprising one or more of an additive selected from the group consisting of flavoring agents, coloring agents, aromatizing agents, texturizing agents, sugar, and animal and vegetable proteins.

8. The gelling composition of claim 5, prepared by a method comprising:
   (a) blending gellan gum and starch in a ratio of about 0.01–0.05:1;
   (b) admixing the blend with a liquid carrier in a proportion of about 2 to 10% of the blend with respect to the total weight of the carrier and the blend; and
   (c) heating and then cooling said blend under conditions effective to gel the blend.

9. A fast-gelling food product having high shear-stability and low-rigidity, comprising a gelled matrix comprising:
   (a) about 2 to 10% of the blend of claim 1 with respect to the total weight of the product; and
   (b) at least one food ingredient dispersed within the matrix.

10. The gelled product of claim 9, wherein the food ingredient is selected from the group consisting of food fillings, creams, foams, toppings, mousses, soups and sauces.

11. The gelled product of claim 9, obtained by a method comprising:
    (a) dispersing at least one food ingredient in a solution of the blend of claim 1; and
    (b) heating and then cooling the solution comprising the blend and the food ingredient under conditions effective to form the gelled matrix containing said food ingredient therewithin.

12. A method of preparing a fast-gelling blend having high shear-stability and low-rigidity, comprising:
    (a) blending gellan and starch in a ratio of about 0.01–0.05:1;
    (b) admixing the blend with a liquid carrier in a proportion of about 2 to 10% of the blend with respect to the total weight of the carrier and the blend; and
    (c) heating to about 65° to 95° C. for a period of time of about 30 sec. to 5 min. and then cooling said admixed blend under conditions effective to gel the blend.

13. The method of claim 12, further comprising shearing the gelled blend; and allowing the sheared blend to stand for a period effective to attain a creamy consistency.

14. A method of preparing a fast-gelling food product of high shear-stability and low rigidity, comprising:
    (a) dispersing at least one food ingredient in a solution of the blend of claim 1; and
    (b) heating to about 65°–95° C. and then cooling the solution comprising the blend and the food ingredient under conditions effective to form a gelled matrix containing said food ingredient therewithin.

15. The method of claim 14, wherein the solution is an aqueous solution; and the blend is present in an amount of about 2 to 10% by weight with respect to the total weight of the food product.

16. The method of claim 14, further comprising cooking the gelled food product; and cooling the cooked product.

* * * * *